(12) United States Patent
Boss et al.

(10) Patent No.: US 10,890,988 B2
(45) Date of Patent: Jan. 12, 2021

(54) HIERARCHICAL MENU FOR APPLICATION TRANSITION

(71) Applicant: International Business Machines Corporation, Armonk, NY (US)

(72) Inventors: Gregory J. Boss, Saginaw, MI (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/269,073

(22) Filed: Feb. 6, 2019

(65) Prior Publication Data

US 2020/0249786 A1    Aug. 6, 2020

(51) Int. Cl.
*G06F 3/0354* (2013.01)
*G06F 3/041* (2006.01)
*G06F 3/044* (2006.01)
*G01L 1/14* (2006.01)

(52) U.S. Cl.
CPC .......... *G06F 3/03547* (2013.01); *G01L 1/146* (2013.01); *G06F 3/044* (2013.01); *G06F 3/0414* (2013.01); *G06F 2203/0383* (2013.01); *G06F 2203/04105* (2013.01)

(58) Field of Classification Search
CPC ....... G06F 3/03547; G06F 2203/04105; G06F 3/0414–0416; G06F 3/041; G06F 3/0412; H04N 21/42224; H04N 5/4403; H04N 21/42204; H04N 5/44543; H04N 2005/443
See application file for complete search history.

(56) References Cited

U.S. PATENT DOCUMENTS

| 8,539,373 | B1 | 9/2013 | Jitkoff et al. | |
|---|---|---|---|---|
| 9,658,740 | B2 | 5/2017 | Chaudhri | |
| 10,216,370 | B2 | 2/2019 | Barrus et al. | |
| 10,444,944 | B2 | 10/2019 | Yoshida | |
| 2003/0208575 | A1* | 11/2003 | Cox ....................... | G06Q 30/02 709/223 |
| 2009/0237374 | A1* | 9/2009 | Li ......................... | G06F 3/0414 345/174 |

(Continued)

OTHER PUBLICATIONS

Surfly, "Co-browsing Solution with Video Chat", https://www.surfly.com/, Accessed on Feb. 5, 2018, 4 pages.

*Primary Examiner* — Sanjiv D. Patel
(74) *Attorney, Agent, or Firm* — Scully, Scott, Murphy & Presser, P C.; Brian M. Restauro, Esq.

(57) ABSTRACT

In an example, a computer device may detect pressure applied to an input location on an input device. The computer device may identify at least one opened application. The computer device may determine an output location based on the input location, where the output location may be a location on a display of the computer device. The computer device may construct an object based on the identified opened applications and the output location. The computer device may output the object on the display at the output location. The computer device may receive a selection of an opened application via the object, where the selected opened application is among the identified opened applications. The computer device may output the selected opened application on the display of the computer device.

20 Claims, 4 Drawing Sheets

(56) References Cited

U.S. PATENT DOCUMENTS

| | | |
|---|---|---|
| 2010/0088628 A1* | 4/2010 | Flygh .................... G06F 3/0481 |
| | | 715/779 |
| 2010/0238126 A1 | 9/2010 | Chen et al. |
| 2011/0141052 A1* | 6/2011 | Bernstein ................ G06F 3/016 |
| | | 345/174 |
| 2014/0351215 A1 | 11/2014 | Xu et al. |
| 2016/0147440 A1* | 5/2016 | Leyon ................... G06F 3/0482 |
| | | 715/773 |
| 2016/0351047 A1 | 12/2016 | Han et al. |
| 2017/0357403 A1* | 12/2017 | Geary ................. G06F 3/04812 |
| 2019/0073095 A1* | 3/2019 | Li ......................... G06F 40/166 |
| 2020/0042087 A1 | 2/2020 | Ang et al. |

* cited by examiner

HIERARCHICAL MENU FOR APPLICATION TRANSITION

BACKGROUND

The present application relates generally to computers, and computer applications, and more particularly to computer-implemented methods and systems relating to mobile device application management systems and user interfaces.

Computing devices such as desktop computers, laptop computers, mobile phones, tablet devices, may include displays or screens to output application content of one or more applications. Examples of application content may include one or more combinations of images, files, texts, media, and/or other types of content. The application content being displayed on the screens may occupy a portion of a display area, or the entire display area, of the screen.

SUMMARY

In some examples, a method of transitioning between applications is generally described. The method may include detecting, by a computer device, pressure applied to an input location on an input device. The method may further include identifying, by the computer device, at least one opened application. The method may further include determining, by the computer device, an output location based on the input location. The output location may be a location on a display of the computer device. The method may further include constructing, by the computer device, an object based on the identified opened applications and the output location. The object may include indicators representing the identified opened applications. The method may further include outputting, by the computer device, the object on the display at the output location. The method may further include receiving, by the computer device, a selection of an opened application via the object. The selected opened application is among the identified opened applications. The method may further include outputting, by the computer device, the selected opened application on the display of the computer device.

In some examples, a system of transitioning between applications is generally described. The system may include a memory device, an input device, a display, and a hardware processor. The hardware processor, the memory device, the input device, and the display may be configured to be in communication with each other. The input device may be configured to detect pressure applied to an input location on the input device. The input device may be further configured to send a level of the pressure to the hardware processor. The input device may be further configured to send the input location to the hardware processor. The hardware processor may be configured to identify at least one opened application. The hardware processor may be further configured to determine an output location based on the input location. The output location may be a location on the display. The hardware processor may be further configured to construct an object based on the identified opened applications and the output location. The object may include indicators representing the identified opened applications. The hardware processor may be further configured to output the object on the display at the output location. The hardware processor may be further configured to receive a selection of an opened application via the object. The selected opened application may be among the identified opened applications. The hardware processor may be further configured to output the selected opened application on the display.

In some examples, a computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

In an example, a user of a device may view an opened application (e.g., an application being executed) on a display of the device. The user may wish to view another opened application, but a size of a display of the device may be insufficient to present a desirable amount of opened applications for the user to make a selection promptly. The user may need to search for the desired opened application by performing a sequence of navigation actions repetitively, which may be cumbersome in some instances. To be described in more detail below, a system 100 in accordance with the present disclosure is effective to output a menu that includes indicators (e.g., icons, screenshots, symbols, and/or other indicators) of a plurality of opened applications on a display or display screen of the device. The opened applications indicated by the menu may be arranged in a hierarchical structure, such that opened applications in other devices paired with the device may also be indicated by the menu. The hierarchical menu in accordance with the present disclosure provides a particular manner to output indicators of opened applications on a display of a computer device. For example, the hierarchical structure of the menu allows the menu to indicate a relatively large amount of opened applications on the display and in one display instance. The hierarchical menu feature may be integrated into a computer device that may lack a functionality to display a relatively large amount of opened applications within a confined display area. Thus, a user interface of the computer device may be improved by displaying a relatively large amount of opened applications in a hierarchical structure. The improved user interface allows a user of the device to transition between opened applications promptly, such as by performing a reduced number of navigation actions.

Figure 1:
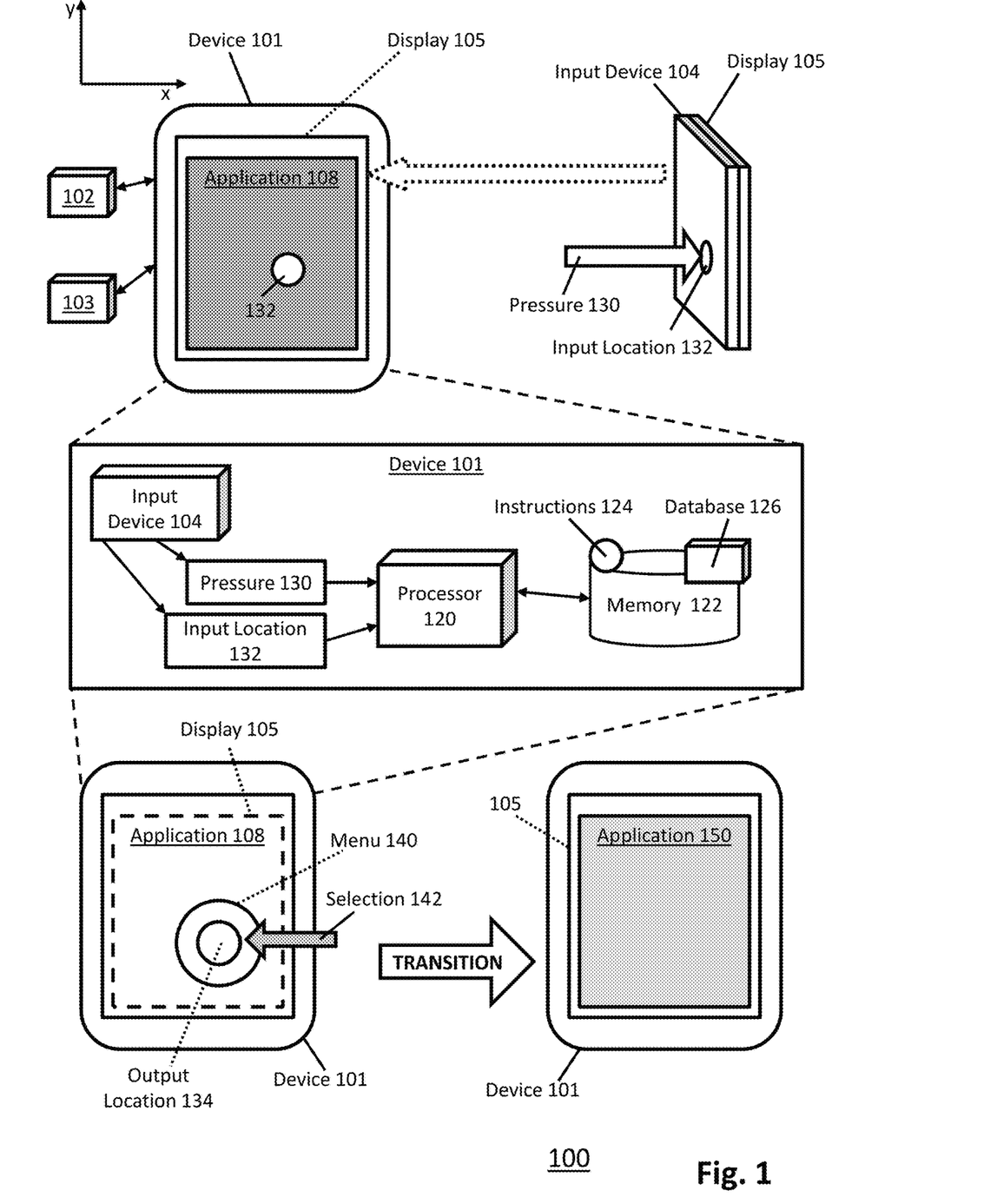
FIG. 1 illustrates an example computer system, in one embodiment, that can be utilized to implement hierarchical menu for application transition.

FIG. 1 illustrates an example computer system, in one embodiment, that can be utilized to implement hierarchical menu for application transition, arranged in accordance with at least some embodiments described herein. In some examples, the system 100 may be implemented with a computer device 101 ("device 101"). The device 101 may include an input device 104, a display 105, a processor 120, and a memory 122 configured to be in communication with each other. The input device 104 may be a touchscreen layered on a surface of the displayed 105. The input device 104 may be configured to receive input from a user of device 101, where the input may include pressure being applied on a surface of the touchscreen. The processor 120 may be a central processing unit of the device 110, and may be configured to control operations of the input device 104, the display 105, the memory 122 and/or other components of the device 101. In some examples, the system 100 and/or the device 101 may include additional hardware components, such as programmable logic devices, microcontrollers, memory devices, and/or other hardware components, that may be configured to perform respective tasks of the methods described in the present disclosure. In some examples, the processor 120 may be configured to execute software modules that include instructions to perform each respective task of the methods described in the present disclosure.

The memory 122 is configured to selectively store instructions executable by the processor 120. For example, in one embodiment, the memory 122 may store a set of application transition instructions 124 ("instructions 124"), where the instructions 124 include instructions, such as executable code, related to machine learning algorithms, database algorithms, image processing, network communications, and/or other algorithms or techniques, which may implement the system 100. The processor 120 is configured to execute one or more portions of the instructions 124 in order to facilitate implementation of the system 100. In some examples, the instructions 124 may be packaged as a standalone application that may be installed on the device 110, such that the instructions 124 may be executed by the processor 120 to implement the system 100. In some examples, the instructions 124 may be stored in a programmable hardware component that may be embedded as part of the processor 120.

The device 101 may be configured to be in communication (e.g., connected, or paired) with one or more other devices, such as a device 102 and a device 103. Devices 101, 102, 103 may be configured to be in communication through a network, such as the Internet, a cellular network, a local area network (e.g., Wi-Fi), a PAN (e.g., Bluetooth®), and/or other types of network. Some examples of the devices 101, 102, 103 may include, but not limited to, desktop computers, laptop computers, tablet computers, cellular phones, smartphones, wearable electronic devices, smartwatches, smart speakers, and/or other types of computer devices. The devices 101, 102, 103 may be the same type of device, or may be different types of devices. For example, the devices 101, 102, 103 may each be a smartphone. In another example, the device 101 may be a smartphone, the device 102 may be a wearable device such as a smartwatch, and the device 103 may be a tablet computer. The devices 101, 102, 103 may each be configured to execute respective sets of applications.

The memory 122 is further configured to store a database 126. The database 126 may store data relating to devices that may be currently paired and/or that were paired at least once with the device 101 (e.g., devices 102, 103). The database 126 may also store data and/or tables indicating applications that are installed on each paired device with an execution status, such as opened, currently running, suspended, and/or other types of status relating to execution of applications installed on each paired device. The processor 120 is configured to update the database 126 when applications are installed, removed, opened, suspended, closed, and/or other types of activities, are being performed at the device 101 and/or pair devices 102, 103. For example, the processor 120 may associate a new application with an identifier of device 101 in the database 126 in response to the new application is installed in device 101. In another example, in response to a new application being installed in device 102, device 102 may send a notification to device 101 indicating the newly installed application. The processor 120 may update the database 126, such as associating the new application to an identifier of the device 102, to reflect that the new application is installed in device 102. In another example, device 102 may begin execution of a particular application, and may send a notification to device 101 to indicate that the particular application is now an opened application. The processor 120 may update the database 126 to reflect that the particular application is an opened application on device 102.

The input device 104 may be configured to receive inputs, such as pressure applied by a user of the device 101, or by an object (e.g., a stylus) on a surface of the input device 104. In some examples, the input device 104 may be implemented as a multi-touch system such that one or more points of contact with the surface of the input device 104 may be detected. In some examples, the input device 104 may be configured to detect different levels of pressure being applied on the surface of the input device 104. In some examples, the input device 104 may be configured to detect a duration of pressure being applied to the surface of the input device 104. The input device 104 may include a processing unit, such as a microcontroller, configured to determine locations in which pressure was applied. The received input, or the applied pressure, may distort an electrostatic field of the input device 104, where the distortion may be measurable as changes in capacitance. The measured distortion and the determined pressure location may be transmitted from the input device 104 to the processor 120, and the processor 120 may perform particular actions based on the pressure location and different attributes of the pressure.

In an example shown in FIG. 1, pressure 130 may be applied at an input location 132 on a surface of the input device 104. In some examples, pressure 130 may be applied while a user of device 101 is viewing the display 105 of the device 101. For example, the user may be viewing a home page of the device 101, or may be viewing an application 108 on the display 105. The application 108 may be an opened application, which may be an application that is currently running by the device 101, or currently being executed by the device 101. Input device 104 may send data associated with the pressure 130 and the input location 132 to the processor 120. For example, input device 104 may send a number of electrical pulses to the processor 120, where the number of electrical pulses may be used by the processor 120 to determine a duration and/or a level of pressure of the pressure 130. In some examples, the input device 104 may send identifiers of capacitive elements that are being changed by the pressure 130. The processor 120 may identify input location 132 in a mapping (which may be stored in memory 122) between identifiers of the capacitive elements with different locations on the surface of the input device 104. In some examples, the input device 104 may send input location 132 to the processor 120 as coordinates (e.g., x, y coordinates) that represent positions of the capacitive elements being changed by the application of the pressure 130.

The processor 120 may identify applications that are opened on device 101, and on any devices that may be currently paired with device 101, such as devices 102, 103. The processor 120 may query the database 126 to identify at least one opened applications on devices 101, 102, 103. To be described in further detail below, the processor 120 may construct an object based on the identified opened applications, the pressure 130, and the input location 132. The object may include a list of the identified opened applications. In some examples, the object may be an image object, such that the processor 120 may output the object on the display as an image. In the example shown in FIG. 1, an example of the object may be a menu 140, where the menu 140 may include indicators representing the identified opened applications. The indicators shown by the menu 140 may include images, icons, texts, numbers, screenshots, and/or other types of representation of the identified opened applications. Other examples of the object may include, but not limited to, a list, a table, an animated image, and/or other types of objects.

The processor 120 may determine an output location 134 on the display 105 to output the menu 140. The determination of the output location 134 may be based on the input location 132 of pressure 130. In an example, the memory 122 may store a map indicating mappings between the locations of the capacitive elements of the input device 104 and locations of pixels of the display 105. The processor 120 may identify one or more locations of pixels of the display 105 that are mapped to locations (e.g., input location 132) of the capacitive elements changed by the application of the pressure 130. The processor 120 may assign the identified locations as the output location 134 of the menu 140, and may output the menu 140 on the display 105 at the output location 134. In an example shown in FIG. 1, a shape of the menu 140 may be circular, and the processor 120 may output the menu 140 such that a center of the menu 140 is positioned at the output location 134. Although the menu 140 is shown as a circular shape in the example in FIG. 1, the shape of the menu may be any arbitrary shape. If the application 108 was opened and shown in display 105, the menu 140 may overlay the application 108 in the display 105. In some examples, the processor 120 may fade the display of application 108, such that the menu 140 may overlay an opaque view of the application 108 in the display 105. In another example, the processor 120 may output the menu 140 with an intensity that is brighter than an intensity of the application 108 being displayed. In another example, the processor 120 may execute image processing techniques to focus the menu 140 such that the menu 140 may appear to be isolated from the application 108 displayed on the display 105.

The user of the device 101 may input a selection 142 using the menu 140 shown in the display 105. The selection 142 may be performed by the user of device 101, such as by applying pressure on the surface of the input device 104. The selection 142 may be a selection of an indicator representing an opened application in the menu 140. In the example shown in FIG. 1, the selection 142 may be a selection of an opened application 150. The processor 120 may receive the selection 142 and may output the application 150 in the display 105. The display of the opened application 150 may remove the display of the menu 140 from the display 105. In some examples, the application 150 and the application 108 may be pages of the same application, such as different browser windows or tabs of a web browser application. In some examples, the selected opened application 150 may be an application opened on device 102. For example, the application 108 may be a first tab displaying a first webpage on the device 101, and the application 150 may be a second tab displaying a second webpage on the device 102. The selection 142 of the application 150 using the menu 140 displayed by device 101 may cause the processor 120 to output the second webpage on the display 105 of device 101.

Figure 2:
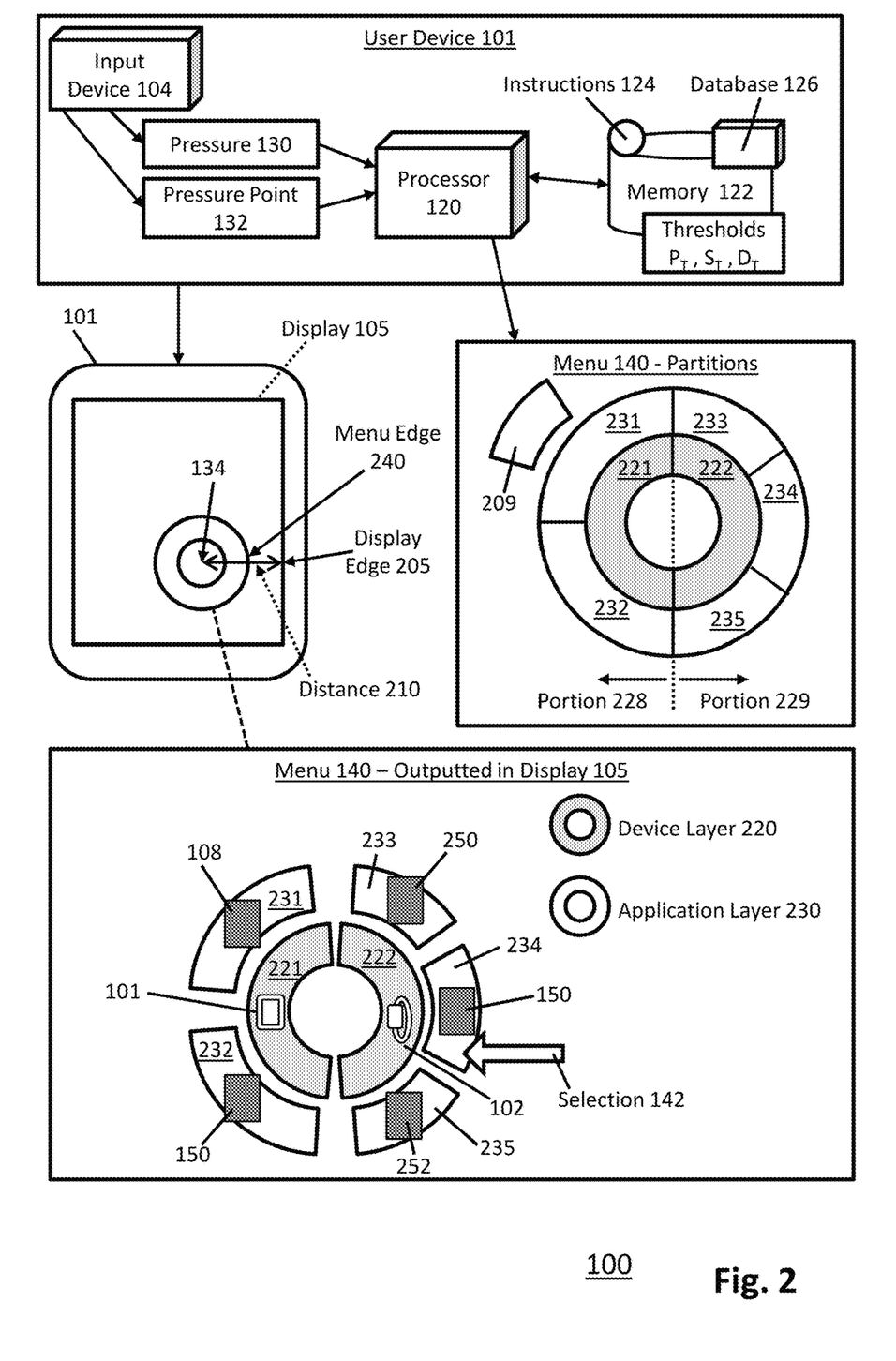
FIG. 2 illustrates the example system of FIG. 1 with additional details relating to construction of a hierarchical menu for application transition, in one embodiment.

FIG. 2 illustrates the example system of FIG. 1 with additional details relating to construction of a hierarchical menu for application transition, in one embodiment. FIG. 2 may include components that are labeled identically to components of FIG. 1, which will not be described again for the purposes of clarity. The description of FIG. 2 may reference at least some of the components of FIG. 1.

The processor 120 of the device 101 may construction the menu 140 based on the identified opened applications, the pressure 130, and the input location 132. In an example, the memory 122 may store a threshold $P_T$ indicating a threshold pressure to trigger construction of the menu 140. For example, the threshold may be $P_T$ and a level of pressure 130 may be $P_1$. The processor 120 may compare $P_1$ with $P_T$. If $P_1$ is less than $P_T$, then processor 120 may determine that the pressure 130 may not be an input command to construct the menu 140. In $P_1$ is greater than $P_T$, then processor 120 may determine that the pressure 130 may be an input command to construct the menu 140.

In another example, the memory 122 may store a time threshold $S_T$ indicating a threshold duration to trigger construction of the menu 140. For example, the time threshold may be $S_T$ and a duration of pressure 130 may be $S_1$. The processor 120 may compare $S_1$ with $S_T$. If $S_1$ is less than $S_T$, then processor 120 may determine that the pressure 130 may not be an input command to construct the menu 140. If $S_1$ is greater than $S_T$, then processor 120 may determine that the pressure 130 may be an input command to construct the menu 140. In some examples, the user of the device 101 may apply a desirable level and/or duration of pressure to define the thresholds $P_T$ and $S_T$. In some examples, the user of the device 101 may change the thresholds $P_T$ and $S_T$.

In another example, the memory 122 may store a distance threshold $D_T$ indicating a threshold distance between a the input location 132 and a display edge 205 of the display 105. The processor 120 may determine a distance 210 between the input location 132 and display edge 205. If the distance 210 is greater than $D_T$, then processor 120 may determine that a menu edge 240 of the menu 140 will not contact the display edge 205 if a center of menu 140 is outputted at the output location 134. If the distance 210 is less than $D_T$, then processor 120 may determine that the menu edge 240 of the menu 140 will contact the display edge 205 if a center of menu 140 is outputted at the output location 134. In an example, in response to the distance 210 being less than $D_T$, the processor 120 may identify another location to be the output location 134 of the menu 140. In another example, in response to the distance 210 being less than $D_T$, the processor 120 may restrict a size of the menu 140 such that, such that the menu edge 240 of the menu 140 will not contact the display edge 205. In another example, in response to the distance 210 being less than $D_T$, the processor 120 may output a portion of the menu 140 with a button 209 (or another interactive user interface element) in the display 105, such that the user of the device 101 may select the button 209 to view another portion of the menu 140 that is not being outputted. In some examples, the thresholds $P_T$, $S_T$ and $D_T$ may be predefined by an operating system of the device 101.

To construct the menu 140, the processor 120 may identify (e.g., using the database 126) a number of devices paired with the device 101. The processor 120 may partition a device layer 220 of the menu 140 based on the identified number of paired devices. In an example shown in FIG. 2, the processor 120 may identify device 102 being paired to device 101. The processor 120 may partition a device layer 220 of the menu 140 into two partitions 221, 222. The partition 221 may represent the device 101, and the partition 222 may represent the device 102. The processor 120 may partition an application layer 230 of the menu 140 based on the number of identified paired devices. For example, the processor may partition the application layer 230 into a portion 228 and a portion 229, where the portion 228 is reserved for opened applications run by the device 101 and the portion 229 is reserved for opened applications run by the device 102. In an example embodiment, the partitions 221, 222, 231, 232, 233, 234, 235 may not be overlapped, or may be separated.

The processor 120 may identify (e.g., using the database 126) a number of opened applications being run by each one of devices 101, 102. In the example shown in FIG. 2, the processor 120 may identify two opened applications 108, 150 are opened in the device 101, and may identify three opened applications 150, 250, 252, opened in the device 102. The processor 120 may partition the portion 228 of the application layer 230 into partitions 231, 232, and may partition the portion 229 of the application layer 230 into partitions 233, 234, 235. In an example embodiment, the processor 120 may capture an image, such as a screenshot, of each identified opened application and insert the captured images into corresponding partitions. For example, the processor 120 may capture a screenshot of the application 150 opened in the device 101, and may insert the screenshot into the partition 232 of the application layer 230. Thus, in an example shown in FIG. 2 where the menu 140 is outputted in display 105, each partition in the application layer 230 may include an indicator (e.g., screenshot) of an opened application. Thus, the menu 140 may show that applications 108, 150 are opened in device 101 and applications 150, 250, 252 are opened in device 102. In another example, the user of the device 101 may select (e.g., apply pressure) an area on the display that is outside of the menu 140 without selecting an application to exit the menu 140. By exiting the menu 140, the menu 140 will no longer be shown in the display 105 and the display 105 will show the application 108 that was being viewed during the application of the pressure 130.

In some examples, the number of opened applications identified by the processor 120 may exceed a threshold number, which may cause the menu 140 to be restricted to an undesirable size (e.g., too small that the user cannot view the screenshots clearly), or the number of partitions in menu 140 may be insufficient to hold all opened applications. The processor 120 may output a first application layer of the menu 140 and the button 209. The user of the device 101 may select the button 209 to view a second application layer of the menu 140 to view more opened applications. The processor 120 may optimize the menu 140, such as determining which opened applications shall be shown in the first application layer, which may be viewed without selecting the button 209. For example, the processor 120 may execute machine learning instructions to train a model that represents usage behavior of the user of the device 101, such as usage of particular applications during particular days, dates, time, weather, and/or other scenarios. If the device 101 executes a weather application (e.g., for the user of the device 101 to check the weather forecast) at 7:00 AM every day, a construction of the menu 140 around 7:00 AM may include a weather application in the first application layer of the menu 140. If the device executes a news application (e.g., for the user of the device 101 to read the news) at 9:00 PM every day, a construction of the menu 140 around 9:00 PM may include a news application in the first application layer of the menu 140 and may include the weather application in the second layer of the menu 140. In some examples, the processor 120 may prioritize applications to be shown in the first application layer based on an amount of usage (e.g., the applications with the most usage will be shown first). In some examples, the user of the device 101 may define which applications are to be inserted into the first application layer of the menu 140.

In some examples, the processor 120 may track the application usage of the user based on authorizations by the user. Embodiments of the present invention may provide features that allow the user of the device 101 to select whether to participate in the usage tracking that may be performed by the processor 120. In some examples, the processor 120 may terminate the application usage tracking in response to receiving an input from the user indicating a command to opt-out from the application tracking. In some examples, the processor 120 may push a notification to be displayed in the display 105 when the processor 120 begins to perform the application usage tracking.

Figure 3:
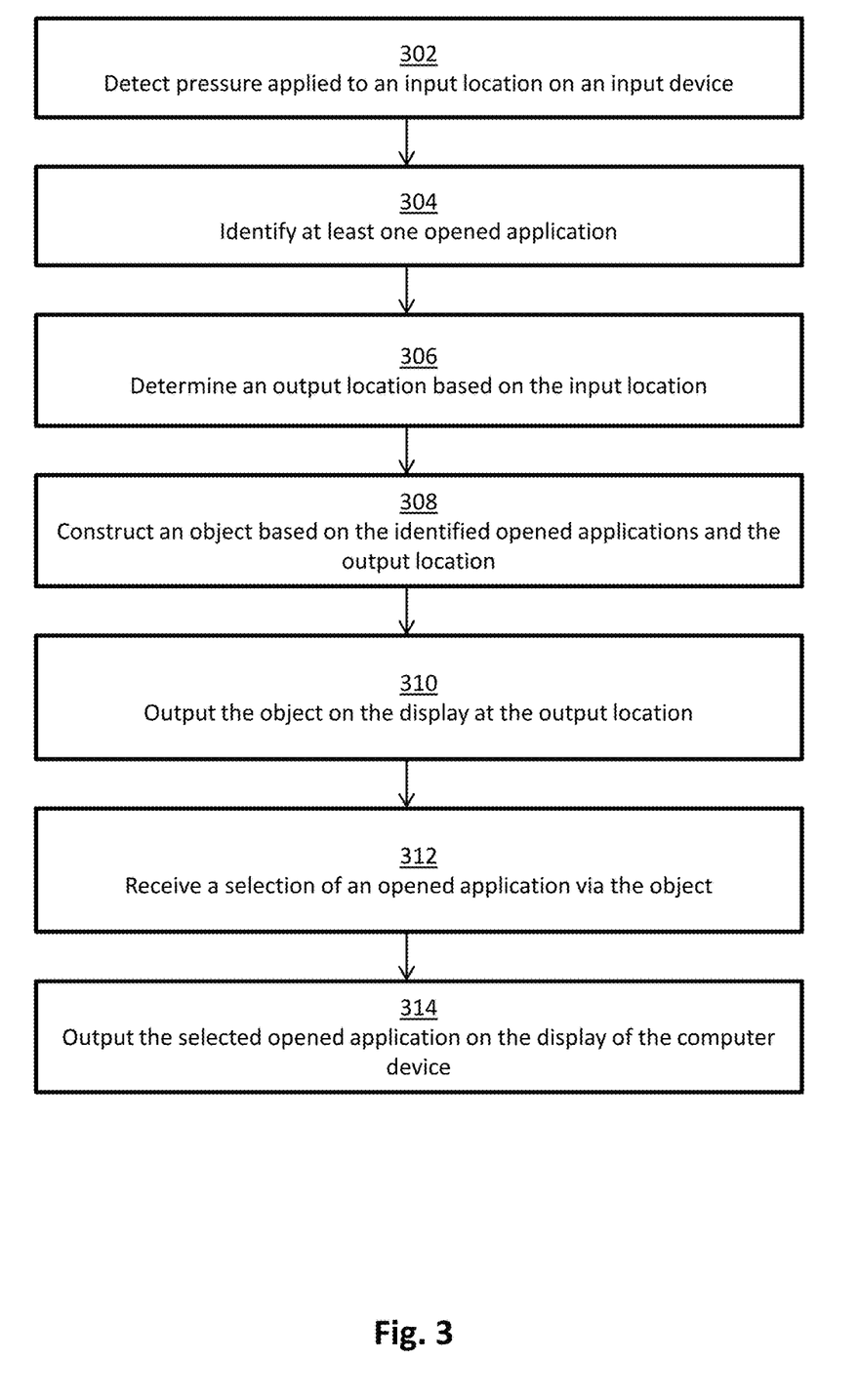
FIG. 3 illustrates a flow diagram relating to a process, in one embodiment, to implement hierarchical menu for application transition.

FIG. 3 illustrates a flow diagram relating to a process, in one embodiment, to implement hierarchical menu for application transition, arranged in accordance with at least some embodiments presented herein. The process in FIG. 3 may be implemented using, for example, system 100 discussed above. An example process may include one or more operations, actions, or functions as illustrated by one or more of blocks 302, 304, 306, 308, 310, 312, and/or 314. Although illustrated as discrete blocks, various blocks may be divided into additional blocks, combined into fewer blocks, eliminated, or performed in parallel, depending on the desired implementation.

Processing may begin at block 302, where a computer device detects pressure applied to an input location on an input device. Processing may continue from block 302 to block 304. At block 304, the computer device identifies at least one opened application. In some examples, the computer device may identify opened applications running on another device different from the computer device. Processing may continue from block 304 to block 306. At block 306, the computer device determines an output location based on the input location, where the output location is a location on a display of the computer device.

Processing may continue from block 306 to block 308. At block 308, the computer device constructs an object based on the identified opened applications and the output location. The object includes indicators representing the identified opened applications. In some examples, the computer device may determine a number of devices running the identified opened applications. The computer device may partition a first layer of the object based on the number of identified devices. The computer device may determine a number of identified opened applications being run by each identified device. The computer device may partition a second layer of the object based on the number of identified opened applications being run by each identified device.

Processing may continue from block 308 to block 310. At block 310, the computer device outputs the object on the display at the output location. In some examples, the object may be outputted to overlay a first opened application being outputted on the display of the computer device, and the selected application is a second opened application different from the first opened application. Processing may continue from block 310 to block 312. At block 312, the computer device receives a selection of an opened application via the object, where the selected opened application is among the identified opened applications. Processing may continue from block 312 to block 314. At block 314, the computer device outputs the selected opened application on the display of the computer device.

Figure 4:
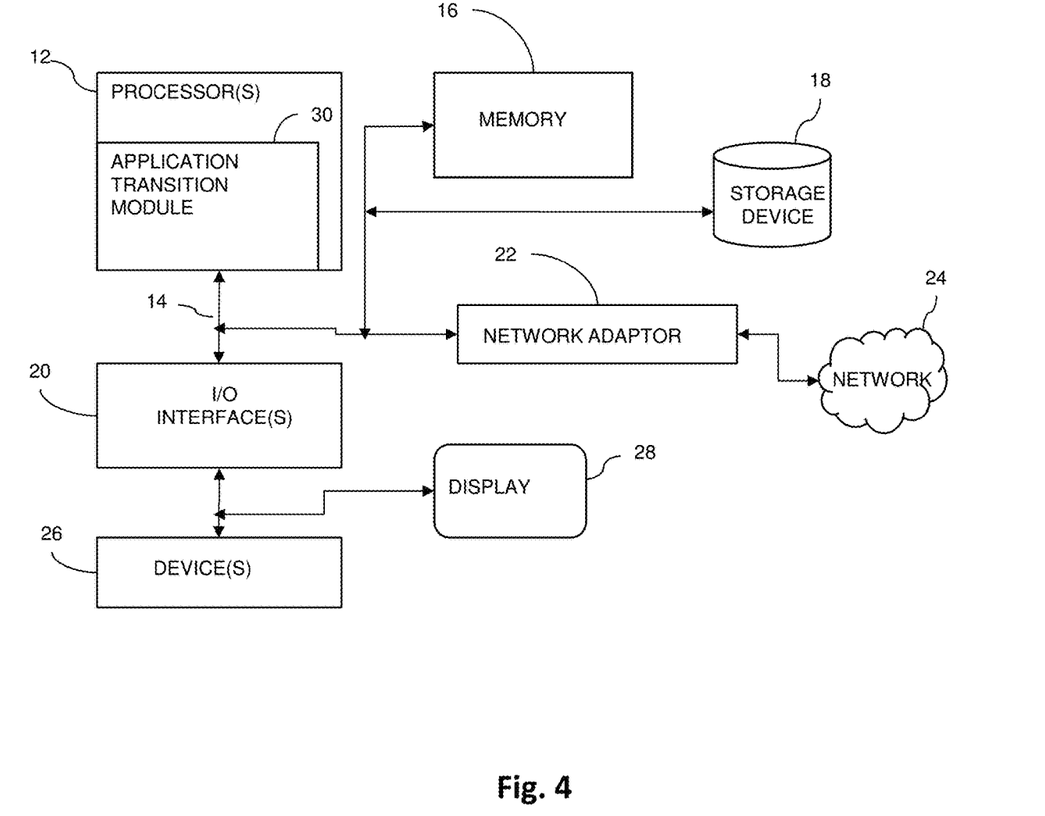
FIG. 4 illustrates a schematic of an example computer or processing system that may implement hierarchical menu for application transition, in one embodiment.

FIG. 4 illustrates a schematic of an example computer or processing system that may implement hierarchical menu for application transition in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., application transition module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage device 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    detecting, by a computer device, pressure applied to an input location on an input device;
    identifying, by the computer device, at least one opened application;
    determining, by the computer device, an output location based on the input location, wherein the output location is a location on a display of the computer device;
    constructing, by the computer device, an object based on the identified opened applications and the output location, wherein the object comprises at least a first layer and a second layer, the first layer indicates a number of devices running the identified opened applications, and the second layer indicates a number of opened applications among the identified opened applications;

outputting, by the computer device, the object on the display at the output location;

receiving, by the computer device, a selection of an opened application via the object, wherein the selected opened application is among the identified opened applications; and outputting, by the computer device, the selected opened application on the display of the computer device.

2. The computer-implemented method of claim 1, wherein identifying the opened applications comprises identifying opened applications running on another device different from the computer device.

3. The computer-implemented method of claim 1, wherein the object is outputted to overlay a first opened application being outputted on the display of the computer device, and the selected application is a second opened application different from the first opened application.

4. The computer-implemented method of claim 1, wherein constructing the object comprises:
   determining, by the device, the number of identified opened applications; and
   partitioning, by the device, the second layer of the object based on the number of identified opened applications.

5. The computer-implemented method of claim 1, wherein constructing the object comprises:
   identifying, by the device, the number of devices running the identified opened applications;
   partitioning, by the device, the first layer of the object based on the number of identified devices;
   determining, by the device, the number of identified opened applications being run by each identified device; and
   partitioning, by the device, the second layer of the object based on the number of identified opened applications being run by each identified device.

6. The computer-implemented method of claim 1, further comprising:
   comparing, by the device, a level of the pressure with a threshold value; and
   determining, by the device, that the level of the pressure exceeds the threshold value based on the comparing, wherein identifying the at least one opened application is performed in response to the level of the pressure exceeding the threshold value.

7. The computer-implemented method of claim 1, further comprising:
   comparing, by the device, a duration of the pressure with a threshold value; and
   determining, by the device, that the duration of the pressure exceeds the threshold value based on the comparing, wherein identifying the at least one opened application is performed in response to the duration of the pressure exceeding the threshold value.

8. The computer-implemented method of claim 1, further comprising:
   determining, by the device, a distance between the input location and an edge of the display;
   comparing, by the device, the distance with a threshold distance;
   determining, by the device, that the distance is greater than the threshold distance; and
   determining, by the device, a size of the object, wherein constructing the object comprises restricting the size of the object to the determined size.

9. A system comprising:
   a memory device;
   an input device;
   a display;
   a hardware processor configured to be in communication with the memory device, the input device, and the display;
   the input device being configured to:
      detect pressure applied to an input location on the input device;
      send a level of the pressure to the hardware processor;
      send the input location to the hardware processor;
   the hardware processor is configured to:
      identify at least one opened application;
      determine an output location based on the input location, wherein the output location is a location on the display;
      construct an object based on the identified opened applications and the output location, wherein the object comprises at least a first layer and a second layer, the first layer indicates a number of devices running the identified opened applications, and the second layer indicates a number of opened applications among the identified opened applications;
      output the object on the display at the output location;
      receive a selection of an opened application via the object, wherein the selected opened application is among the identified opened applications; and
      output the selected opened application on the display.

10. The system of claim 9, wherein the memory device is configured to store a database, and the hardware processor is further configured to query the database to identify opened applications running on another device different from a computer device that includes the hardware processor, the input device, and the display.

11. The system of claim 9, wherein the object is outputted to overlay a first opened application being outputted on the display, and the selected application is a second opened application different from the first opened application.

12. The system of claim 9, wherein the hardware process is further configured to:
   determine the number of identified opened applications; and
   partition the second layer of the object based on the number of identified opened applications.

13. The system of claim 9, wherein the hardware process is further configured to:
   identify the number of devices running the identified opened applications;
   partition the first layer of the object based on the number of identified devices;
   determine the number of identified opened applications being run by each identified device; and
   partition the second layer of the object based on the number of identified opened applications being run by each identified device.

14. The system of claim 9, wherein the hardware process is further configured to:
   compare the level of the pressure with a threshold value stored in the memory device; and
   determine that the level of the pressure exceeds the threshold value based on the comparing, wherein the identification of the at least one opened application is performed in response to the level of the pressure exceeding the threshold value.

15. The system of claim 9, wherein the hardware process is further configured to:

compare a duration of the pressure with a threshold value stored in the memory device; and determine that the duration of the pressure exceeds the threshold value based on the comparing, wherein the identification of the at least one opened application is performed in response to the duration of the pressure exceeding the threshold value.

16. The system of claim 9, wherein the hardware process is further configured to:

determine a distance between the input location and an edge of the display;

compare the distance with a threshold distance stored in the memory device;

determine that the distance is greater than the threshold distance; and determine a size of the object, wherein the construction of the object comprises a restriction of the size of the object to the determined size.

17. A computer program product comprising a computer readable storage medium having program instructions embodied therewith, the program instructions executable by a processing element of a computer device to cause the computer device to:

detect, by the processing element of a computer device, pressure applied to an input location on an input device;

identify, by the processing element, at least one opened application;

determine, by the processing element, an output location based on the input location, wherein the output location is a location on a display of the computer device;

construct, by the processing element, an object based on the identified opened applications and the output location, wherein the object comprises at least a first layer and a second layer, the first layer indicates a number of devices running the identified opened applications, and the second layer indicates a number of opened applications among the identified opened applications;

output, by the processing element, the object on the display at the output location;

receive, by the processing element, a selection of an opened application via the object, wherein the selected opened application is among the identified opened applications; and output, by the processing element, the selected opened application on the display of the computer device.

18. The computer program product of claim 17, wherein the program instructions are further executable by the processing element of the computer device to cause the computer device to identify opened applications running on another device different from the computer device.

19. The computer program product of claim 17, wherein the program instructions are further executable by the processing element of the computer device to cause the computer device to:

identify the number of devices running the identified opened applications;

partition the first layer of the object based on the number of identified devices;

determine the number of identified opened applications being run by each identified device; and partition the second layer of the object based on the number of identified opened applications being run by each identified device.

20. The computer program product of claim 17, wherein the program instructions are further executable by the processing element of the computer device to cause the computer device to:

compare a level of the pressure with a threshold value; and determine that the level of the pressure exceeds the threshold value based on the comparing, wherein the identification of the at least one opened application is performed in response to the level of the pressure exceeding the threshold value.

* * * * *